US012693309B2

(12) United States Patent
Jo et al.

(10) Patent No.: US 12,693,309 B2
(45) Date of Patent: Jul. 28, 2026

(54) METHOD FOR OBTAINING CHARACTERISTICS OF SURFACE TO BE MEASURED, BY USING INCLINED TIP, ATOMIC FORCE MICROSCOPE FOR PERFORMING METHOD, AND COMPUTER PROGRAM STORED IN STORAGE MEDIUM IN ORDER TO PERFORM METHOD

(71) Applicant: PARK SYSTEMS CORP., Suwon-si (KR)

(72) Inventors: Ahjin Jo, Seoul (KR); Sang-il Park, Seongnam-si (KR); Byoung-Woon Ahn, Anyang-si (KR); Seung Hun Baik, Seoul (KR)

(73) Assignee: PARK SYSTEMS CORP., Suwon-si (KR)

( * ) Notice: Subject to any disclaimer, the term of this patent is extended or adjusted under 35 U.S.C. 154(b) by 1049 days.

(21) Appl. No.: 17/792,731

(22) PCT Filed: Dec. 18, 2020

(86) PCT No.: PCT/KR2020/018707
§ 371 (c)(1),
(2) Date: Jul. 14, 2022

(87) PCT Pub. No.: WO2021/145578
PCT Pub. Date: Jul. 22, 2021

(65) Prior Publication Data
US 2023/0046236 A1     Feb. 16, 2023

(30) Foreign Application Priority Data

Jan. 14, 2020     (KR) ........................ 10-2020-0005054
Feb. 12, 2020     (KR) ........................ 10-2020-0017159

(51) Int. Cl.
*G01Q 70/02*     (2010.01)
*G01Q 70/10*     (2010.01)

(52) U.S. Cl.
CPC ............. *G01Q 70/02* (2013.01); *G01Q 70/10* (2013.01)

(58) Field of Classification Search
CPC ......... G01Q 70/02; G01Q 70/10; G01Q 10/06
(Continued)

(56) References Cited

U.S. PATENT DOCUMENTS 5,412,980 A     5/1995 Elings et al.
5,965,881 A * 10/1999 Morimoto .............. B82Y 35/00
977/851

(Continued)

FOREIGN PATENT DOCUMENTS

JP     H10-507000 A     7/1998
JP     2004-132823 A     4/2004
(Continued)

OTHER PUBLICATIONS

Three-dimensional imaging of undercut and sidewall structures by atomic force microscopy.

(Continued)

*Primary Examiner* — Marrit Eyassu
(74) *Attorney, Agent, or Firm* — INVENSTONE PATENT, LLC

(57)     ABSTRACT

A method for acquiring a surface characteristic of a measuring object using a tilted tip, and an atomic force microscope for carrying out the method, are provided. The method includes acquiring a surface characteristic of the measuring object while relatively moving the tip in a first direction with respect to the surface of the measuring object using a first control method, controlling the tip to deviate from an abnormal state by a second control method set based on a (Continued)

predefined shape of the surface of the measuring object when at least one characteristic value obtained by the tip is out of a specific range during the acquiring, and performing the acquiring of the surface characteristic again after the controlling of the tip. The method automatically separates a tip entering the inner space of an undercut structure so that an image deep inside the undercut structure may be acquired.

12 Claims, 10 Drawing Sheets

(58) Field of Classification Search
USPC ............................................................ 73/105
See application file for complete search history.

(56) References Cited

U.S. PATENT DOCUMENTS

| | | | | |
|---|---|---|---|---|
| 6,189,374 | B1 * | 2/2001 | Adderton | ............. G01Q 10/045 |
| | | | | 977/851 |
| 7,644,447 | B2 | 1/2010 | Park et al. | |
| 8,209,766 | B2 | 6/2012 | Park et al. | |
| 2002/0062684 | A1 * | 5/2002 | Adderton | ............... G01Q 60/34 |
| | | | | 73/105 |
| 2004/0020279 | A1 * | 2/2004 | Degertekin | ............. G01Q 30/14 |
| | | | | 73/866.5 |
| 2006/0284083 | A1 * | 12/2006 | Kurenuma | ............. B82Y 35/00 |
| | | | | 250/309 |

| | | | | |
|---|---|---|---|---|
| 2008/0078229 | A1 | 4/2008 | Mancevski et al. | |
| 2009/0200462 | A1 | 8/2009 | Park et al. | |
| 2010/0205697 | A1 * | 8/2010 | Iyoki | ..................... G01Q 10/06 |
| | | | | 850/1 |
| 2010/0218285 | A1 | 8/2010 | Park et al. | |
| 2012/0079635 | A1 | 3/2012 | Liu et al. | |
| 2017/0227577 | A1 | 8/2017 | Liu et al. | |

FOREIGN PATENT DOCUMENTS

| | | | | | |
|---|---|---|---|---|---|
| JP | | 2005-172571 | A | | 6/2005 |
| JP | | 2005283540 | A | * | 10/2005 |
| JP | | 2010006577 | A | | 1/2010 |
| JP | | 2011022010 | A | | 2/2011 |
| KR | | 10-0523031 | B1 | | 10/2005 |
| KR | 10-2006-0037453 | A | | | 5/2006 |
| KR | | 10-0646441 | B1 | | 11/2006 |
| KR | | 10-0761059 | B1 | | 9/2007 |
| KR | 10-2007-0100373 | A | | | 10/2007 |
| KR | 10-2008-0006911 | A | | | 1/2008 |
| KR | | 10-1468061 | B1 | | 12/2014 |
| KR | | 10-1476808 | B1 | | 12/2014 |

OTHER PUBLICATIONS

Japanese Office Action dated Aug. 15, 2023 issued on Application No. 2022-540640.
European search report dated Jan. 31, 2024 issued on Application No. 20914273.6.

* cited by examiner (a)

(b)

Scan direction          Scan direction

METHOD FOR OBTAINING CHARACTERISTICS OF SURFACE TO BE MEASURED, BY USING INCLINED TIP, ATOMIC FORCE MICROSCOPE FOR PERFORMING METHOD, AND COMPUTER PROGRAM STORED IN STORAGE MEDIUM IN ORDER TO PERFORM METHOD

CROSS-REFERENCE TO RELATED APPLICATIONS

This application is a National Stage filing under 35 U.S.C. 371 of International Application No. PCT/KR2020/018707, filed on Dec. 18, 2020, which claims the benefit of earlier filing date and right of priority to Korean Application No. 10-2020-0005054, filed on Jan. 14, 2020 and Korean Application No. 10-2020-0017159, filed on Feb. 12, 2020 in the Korean Intellectual Property Office, the contents of which are all hereby incorporated by reference herein in their entirety.

BACKGROUND OF THE DISCLOSURE

Technical Field

The present invention relates to a method for acquiring a surface characteristic of a measuring object using a tilted tip, an atomic force microscope for carrying out the method, and a computer program stored on a storage medium for carrying out the method. More particularly, the present invention relates to a method for acquiring a surface characteristic of a measuring object using a tilted tip, an atomic force microscope for carrying out the method, and a computer program stored on a storage medium for carrying out the method, capable of acquiring an image deeply to the inside of an undercut structure and easily separating a tip from the inside of the undercut structure.

Background Art

There are various types of microscopes for measuring the surface of a sample. Broadly, the microscopes may be divided into an optical microscope, an electron microscope, and a scanning probe microscope. These microscopes have different advantages and disadvantages due to a difference in a measurement method, and a suitable microscope has been adopted and used in consideration of the difference in the measurement method for the shape of a specific sample.

Meanwhile, recently, with the development of the semiconductor and display industries, a need to measure miniaturized structures is increasing, and particularly, there is a need to accurately measure the shape of a minute undercut structure with a protrusion protruding upward in a large planar structure and a recessed side of the protrusion.

In a sample having such an undercut structure, since the undercut structure is covered from the upper side due to its structural characteristic, it is difficult to measure the inside of the undercut structure with any microscope. Of course, the shape may be determined by measuring the cross section of the undercut structure with a scanning electron microscope (SEM), but since this measurement method is inevitably accompanied by destruction of the sample, it cannot be an ultimate solution for measuring the shape of the undercut structure without damaging the sample.

As a solution capable of measuring the undercut structure without damaging the sample, a scanning probe microscope may be used, and in particular, an atomic force microscope that measures the sample using a tipped cantilever may be used.

However, since it is common for the atomic force microscope to measure the surface of the sample using a tip extending vertically toward the sample, applications of tilting the tip, using a special tip, or the like to measure the structure of the inclined sidewall had to be applied.

The Applicant of the present invention developed a technology of analyzing an overhang surface structure measuring by tilting the tip using the atomic force microscope and succeeded in commercializing the technology under a model name '3DM™', and disclosed a plurality of patents as follows. However, since the tip does not enter deeply into the undercut structure by such a structure that tilts the tip, there is a disadvantage in that it is difficult to sufficiently measure the undercut structure.

(Patent Document 1)

Korean Patent No. 10-0761059 (Title of Invention: Scanning probe microscope capable of measuring overhang sample)

(Patent Document 2)

U.S. Pat. No. 7,644,447 B2 (Title of Invention: Scanning probe microscope capable of measuring samples having overhang structure)

(Patent Document 3)

U.S. Patent Application Publication No. US 2009/0200462 A1 (Title of Invention: SCANNING PROBE MICROSCOPE CAPABLE OF MEASURING SAMPLES HAVING OVERHANG STRUCTURE)

(Patent Document 4)

U.S. Pat. No. 8,209,766 B2 (Title of Invention: Scanning probe microscope capable of measuring samples having overhang structure)

(Patent Document 5)

U.S. Patent Application Publication No. US 2010/0218285 A1 (Title of Invention: SCANNING PROBE MICROSCOPE CAPABLE OF MEASURING SAMPLES HAVING OVERHANG STRUCTURE)

SUMMARY OF THE DISCLOSURE

The present invention is derived to solve the problems and an object of the present invention is to provide a method for acquiring a surface characteristic of a measuring object using a tilted tip, an atomic force microscope for carrying out the method, and a computer program stored on a storage medium for carrying out the method, capable of acquiring an image deeply to the inside of an undercut structure and easily separating a tip from the inside of the undercut structure.

The objects of the present invention are not limited to the above-mentioned objects, and other objects not mentioned can be clearly understood by those skilled in the art from the following description.

One aspect of the present invention provides a method for acquiring a surface characteristic of a measuring object using a measuring device including a tip interacting with the surface of the measuring object. The method includes a normal measuring step of acquiring a surface characteristic of the measuring object while relatively moving the tip in a first direction with respect to the surface of the measuring object using a first control method, a separating step of controlling the tip to deviate from an abnormal state by a second control method set based on a predefined shape of the surface of the measuring object when it is determined as the abnormal state in which at least one characteristic value obtained by the tip is out of a specific range during the normal measuring step, and a step of performing the normal measuring step again after the separating step.

According to a feature of the present invention, the predefined shape of the surface may be a shape of an undercut structure opened to the first direction.

According to another feature of the present invention, the measuring device may be an atomic force microscope, and in the first control method and the second control method, the tip may be operated in a non-contact mode or tapping mode with respect to the measuring object, and the characteristic value of determining the abnormal state may be an amplitude of the vibrating tip, and when the amplitude of the tip is smaller than the specific range, it may be determined as the abnormal state.

According to another feature of the present invention, the tip may extend from the cantilever and have a distal end, and when performing the normal measuring step, the tip may interact with the surface of the measuring object in a tilted state so that the distal end precedes the cantilever with respect to the first direction.

According to another feature of the present invention, the tip may be formed to extend from the cantilever so that the distal end is substantially straight, the measuring device may be configured to move the tip in a second direction for feedback on the surface of the measuring object of the tip, and the second direction may be a direction tilted without being perpendicular to the first direction.

According to another feature of the present invention, the tip may be formed to be tilted from the cantilever so that the distal end is not straight, the measuring device may be configured to move the tip in a second direction for feedback on the surface of the measuring object of the tip, and the second direction may be substantially perpendicular to the first direction.

According to another feature of the present invention, the tip may be formed to be tilted from the cantilever so that the distal end is not straight, the measuring device may be configured to move the tip in a second direction for feedback on the surface of the measuring object of the tip, and the second direction may be a direction tilted without being perpendicular to the first direction.

According to another feature of the present invention, the second control method may be configured by combining a first operation of relatively moving the tip in a direction opposite to the first direction with respect to the surface of the measuring object, and a second operation of separating the tip from the surface of the measuring object.

According to another feature of the present invention, the second control method may be defined so that the first operation and the second operation are performed simultaneously or sequentially.

Another aspect of the present invention provides an atomic force microscope configured to measure the surface of a measuring object by a probe part having a tip and a cantilever. The atomic force microscope includes: an XY scanner configured to move the measuring object so that the tip relatively moves in a first direction with respect to the surface of the measuring object; a head configured so that the probe part may be mounted, and including an optical system capable of measuring vibration or deflection of the cantilever and a Z scanner configured to move the probe part in at least a second direction and an opposite direction thereto so as to control a distance between the tip and the surface of the measuring object based on data obtained by the optical system; and a controller configured to control the XY scanner and the head. The controller may be configured to control the XY scanner and the head so as to perform a normal measurement control of acquiring a surface characteristic of the measuring object while relatively moving the tip in a first direction with respect to the surface of the measuring object using a first control method, a separation control of controlling the tip to deviate from an abnormal state by a second control method set based on the shape of the surface of the measuring object defined in advance when it is determined as the abnormal state in which at least one characteristic value obtained by the tip is out of a specific range during the normal measurement control, and the normal measurement control again after the separation control.

According to a feature of the present invention, the predefined shape of the surface may be a shape of an undercut structure opened to the first direction.

According to another feature of the present invention, the head may be configured to be tiltable, so that the tip is approached obliquely with respect to the surface of the measuring object.

According to another feature of the present invention, the second control method may be configured by combining a first operation of relatively moving the tip in a direction opposite to the first direction with respect to the surface of the measuring object by the XY scanner, and a second operation of separating the tip from the surface of the measuring object by the Z scanner.

Yet another aspect of the present invention provides a computer program stored in a storage medium for performing the method described above.

According to the method of the present invention, it is possible to image more deeply the shape of the undercut structure, and measure an image again by automatically and quickly separating a tip entering the inner space of the undercut structure from the inner space to facilitate the operation, thereby expecting an increased throughout.

5

6

Figure 10:
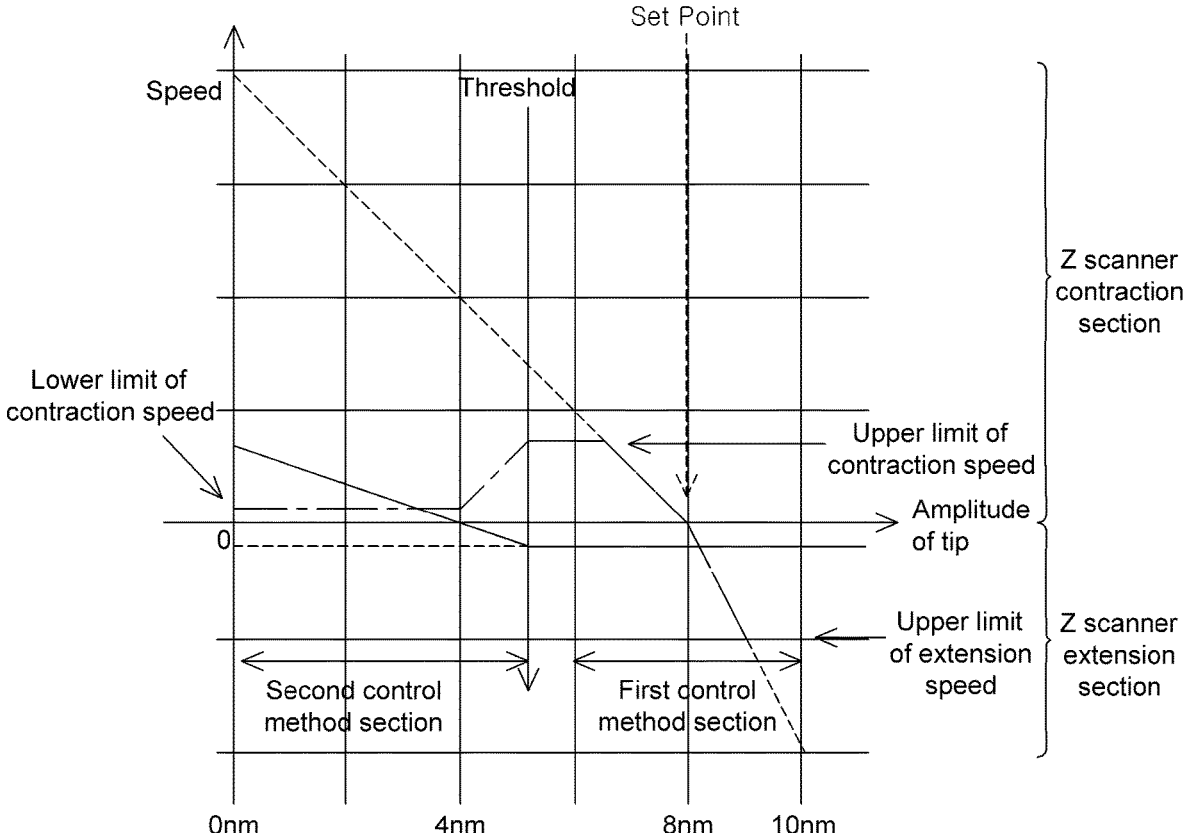

FIG. 10 is a graph showing a relationship between the amplitude and the speed of the tip for a control for carrying out the method according to the present invention.

DETAILED DESCRIPTION OF THE DISCLOSURE

Advantages and features of the present invention, and methods for accomplishing the same will be more clearly understood from exemplary embodiments to be described below in detail with reference to the accompanying drawings. However, the present invention is not limited to the following exemplary embodiments but may be implemented in various different forms. The exemplary embodiments are provided only to make description of the present invention complete and to fully provide the scope of the present invention to a person having ordinary skill in the art to which the present invention pertains with the category of the invention, and the present invention will be defined by the appended claims.

Although the terms "first", "second", and the like are used for describing various components, these components are not confined by these terms. These terms are merely used for distinguishing one component from another component. Therefore, a first component to be mentioned below may be a second component in a technical concept of the present invention. In addition, even if it has been described that second coating after first coating is performed, it goes without saying that performing coating in reverse order is also included in the technical spirit of the present invention.

In using reference numerals in the present specification, even if the drawings are different, the same reference numerals are used as much as possible when the same configuration is illustrated.

The size and thickness of each component illustrated in the drawings are illustrated for convenience in explanation, and the present invention is not necessarily limited to the illustrated size and thickness of the component.

Configuration of Atomic Force Microscope for Carrying Out the Present Invention

First, a configuration of an atomic force microscope as a measuring device for carrying out the method of the present invention will be described as an example. In this specification, the atomic force microscope is only described as an example, but it goes without saying that a method to be described below may be performed even in a scanning probe microscope (SPM) using a tip.

Figure 1:
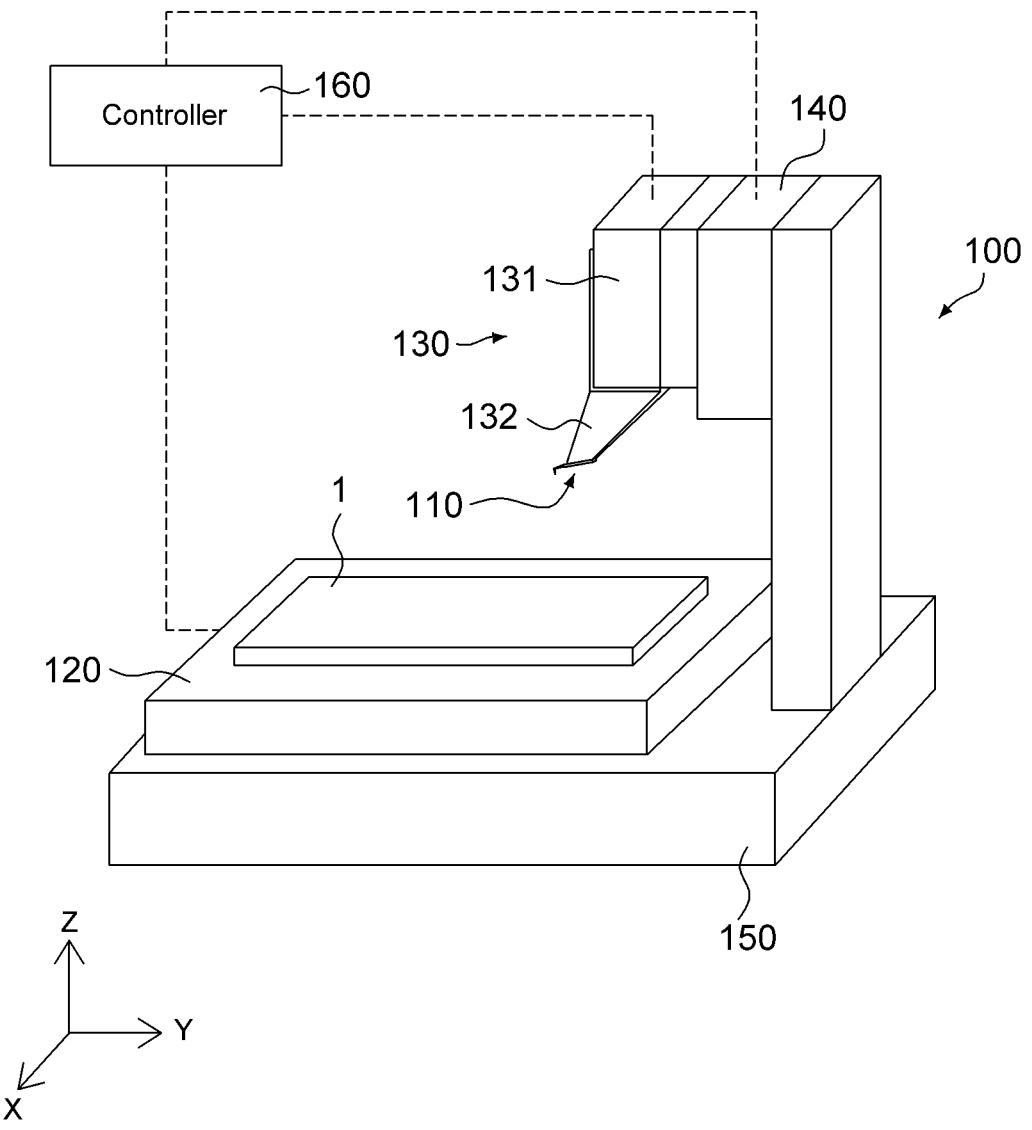
FIG. 1 is a schematic perspective view of an atomic force microscope in which an XY scanner and a Z scanner are separated.
Figure 2:
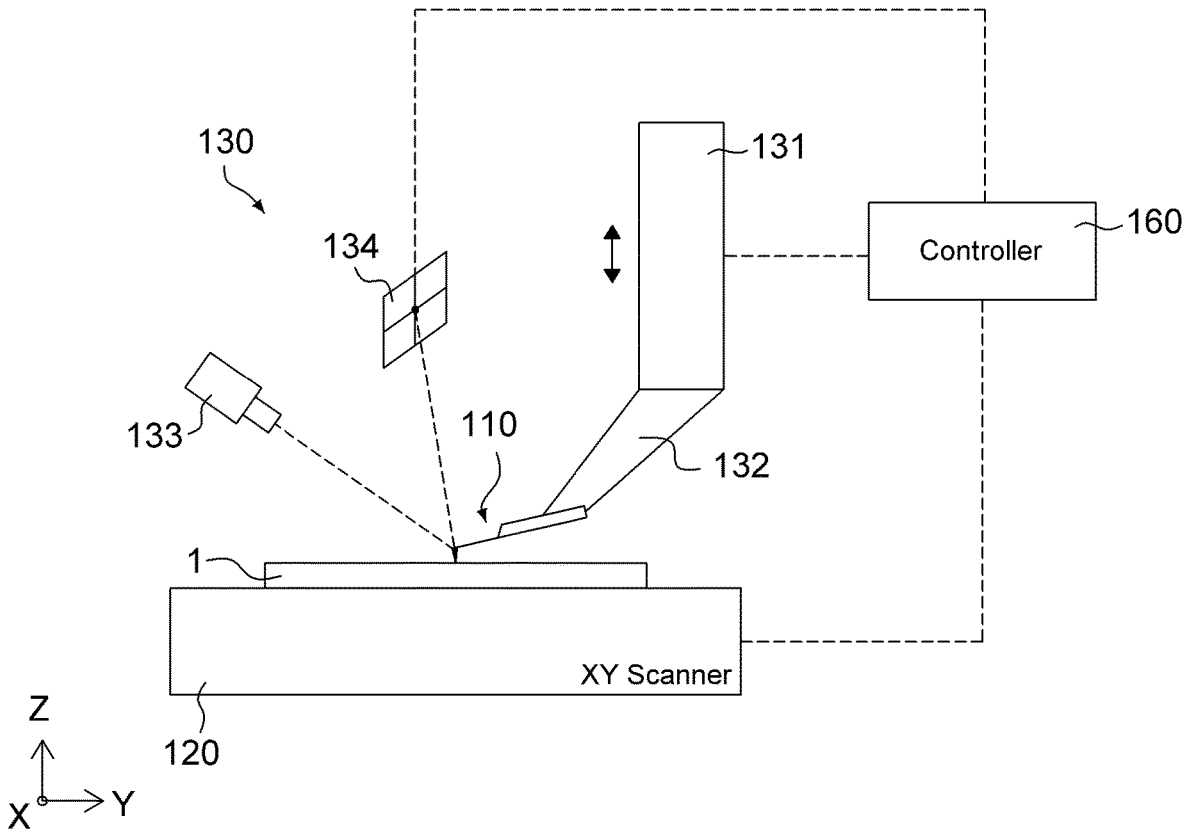
FIG. 2 is a schematic diagram illustrating a method for measuring a measuring object using an optical system.
Figure 3:
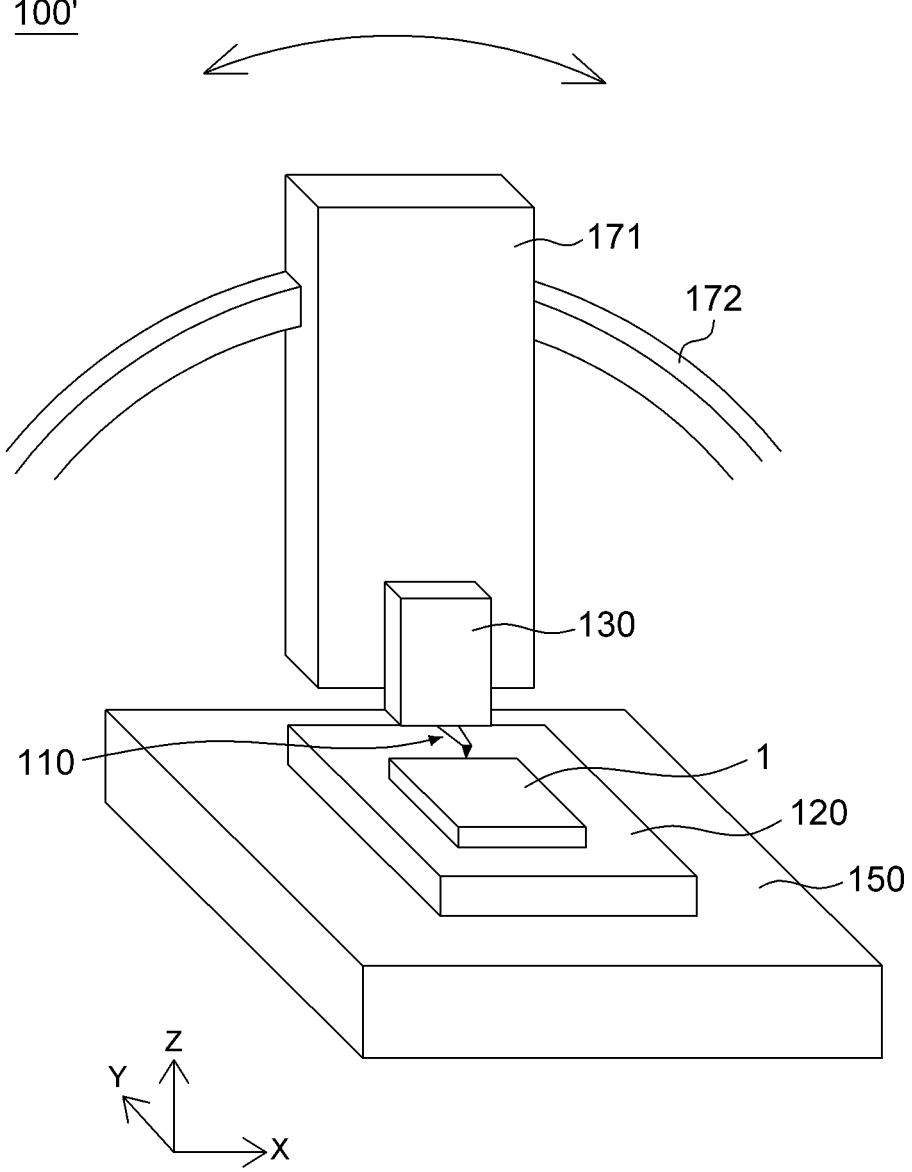
FIG. 3 is a schematic perspective view of an atomic force microscope configured to tilt a head.
Figure 4:
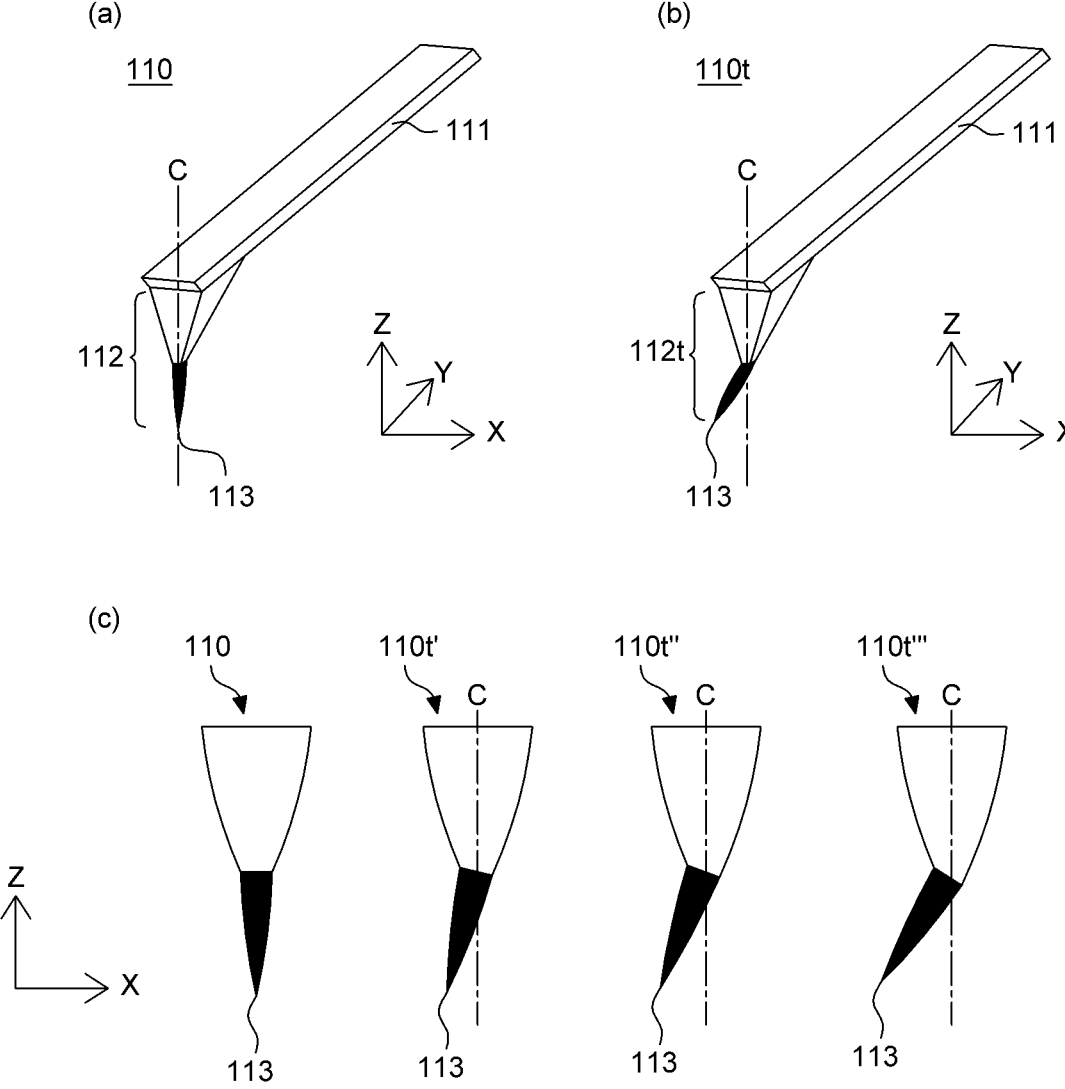
FIG. 4 is a schematic perspective view and a front view of a probe part usable for the method of the present invention.

FIG. 1 is a schematic perspective view of an atomic force microscope in which an XY scanner and a Z scanner are separated, FIG. 2 is a schematic diagram illustrating a method for measuring a measuring object using an optical system, FIG. 3 is a schematic perspective view of an atomic force microscope configured to tilt a head, and FIG. 4 is a schematic perspective view and a front view of a probe part usable for the method of the present invention.

Referring to FIG. 1, an atomic force microscope 100 is configured to include a probe part 110, an XY scanner 120, a head 130, a Z stage 140, a fixing frame 150, and a controller 160.

The probe part 110 has a tip and a cantilever and is configured such that the tip follows the surface of the measuring object 1 in a contact or non-contact state. The probe part 110 may be provided separately from other components below, and is used by being fixed to the head 130 to be described below. The structure of the probe part 110 suitable for the present invention will be described below with reference to FIG. 4.

The XY scanner 120 is configured to move the measuring object 1 so that the tip moves relatively to the surface of the measuring object 1 in at least a first direction. Specifically, the XY scanner 120 functions to scan the measuring object 1 in X and Y directions in an XY plane.

The head 130 is configured so that the probe part 110 may be mounted thereon, and includes an optical system capable of measuring vibration or deflection of a cantilever and a Z scanner configured to move the probe part 110 in at least a second direction and an opposite direction thereto so as to control a distance between the tip and the surface of the measuring object based on data obtained by the optical system. The optical system will be described below with reference to FIG. 2. Here, the Z scanner 131 moves the probe part 110 with a relatively small displacement.

The Z stage 140 moves the probe part 110 and the head 130 in a Z direction with a relatively large displacement.

The fixing frame 150 fixes the XY scanner 120 and the Z stage 140.

The controller 160 is configured to control at least the XY scanner 120, the head 130, and the Z stage 140. The controller 160 controls the XY scanner 120 and the head 130 to perform a normal measurement control of acquiring the surface characteristic of the measuring object 1 while relatively moving the tip on the surface of the measuring object 1 in the first direction using a first control method. In addition, when it is determined as an abnormal state in which at least one characteristic value acquired by the tip deviates from a specific range while performing the normal measurement control, the controller 160 controls the XY scanner 120 and the head 130 to perform a separation control to be controlled so that the tip deviates from an abnormal state by a second control method set based on the shape of the surface of the measuring object 1 defined in advance and the normal measurement control again after the separation control. A detailed control method will be described below with reference to FIGS. 6 to 10.

Meanwhile, the atomic force microscope 110 may further include an XY stage (not illustrated) configured to move the XY scanner 120 on the XY plane with a large displacement. In this case, the XY stage will be fixed to the fixing frame 150.

The atomic force microscope 100 scans the surface of the measuring object 1 with the probe part 110 to acquire images such as topography. The relative movement between the surface of the measuring object 1 and the probe part 110 may be performed by the XY scanner 120, and the moving of the probe part 110 up and down along the surface of the measuring object 1 may be performed by the Z scanner 131. Meanwhile, the probe part 110 and the Z scanner 131 are connected by a probe arm 132.

Referring to FIG. 2, the XY scanner 120 supports a measuring object 1 and scans the measuring object 1 in the XY direction. The driving of the XY scanner 120 may occur, for example, by a piezoelectric actuator, and when the XY scanner 120 is separated from the Z scanner 131 as in the exemplary embodiment, a stacked piezo may be used. The XY scanner 120 will be described by referring to Korean Patent Nos. 10-0523031 (Title of Invention: XY scanner in scanning probe microscope and driving method thereof) and 10-1468061 (Title of Invention: Control method of scanner and scanner device using the same) of which the present Applicant is the Patentee.

The Z scanner 131 may be connected to the probe part 110 to adjust the height of the probe part 110. The driving of the Z scanner 131 may also be performed by a piezoelectric actuator like the XY scanner 120. The Z scanner 131 will be described by referring to Korean Patent No. 10-1476808 (Title of Invention: Scanner device and atomic force microscope including the same) of which the present Applicant is the Patentee. When the Z scanner 131 is contracted, the probe part 110 moves away from the surface of the measuring object 1, and when the Z scanner 131 is extended, the probe part 110 moves close to the surface of the measuring object 1.

The XY scanner 120 and the Z scanner 131 may be separated to be also present as separate members as illustrated in FIGS. 1 and 2, but may be integrated and present into one member by a tubular piezoelectric actuator. In the case of such a tubular piezoelectric actuator, although movement in the XY direction and movement in the Z direction may be performed together, there is a problem in that the behavior in the XY direction and the behavior in the Z direction are coupled to distort an image. However, it goes without saying that such a structure may be utilized in the present invention despite these limitations. Such an XYZ integrated scanner is disclosed in U.S. Patent Application Publication No. 2012-0079635A1 (Title of Invention: Methods and devices for correcting errors in atomic force microscopy) and the like, and in addition, a structure of a well-known atomic force microscope may be used.

The head 130 has an optical system capable of measuring the vibration or deflection of the cantilever of the probe part 110, and this optical system includes a laser generation unit 133 and a detector 134.

The laser generation unit 133 irradiates laser light (illustrated by a dotted line) to the surface of the cantilever of the probe part 110, and the laser light reflected from the surface of the cantilever is focused on a 2-axial detector 134 like a position sensitive photo detector (PSPD). The signal detected by this detector 134 is sent to the controller 160 for control.

The controller 160 is connected to the XY scanner 120 and the Z scanner 131 to control the driving of the XY scanner 120 and the Z scanner 131. In addition, the controller 160 may convert the signal acquired from the detector 134 into a digital signal by an ADC converter, and determine the degree of bending, distortion, etc. of the cantilever of the probe part 110 by using the converted signal. A computer may be integrated into the controller 160 or may be connected to a separate computer and the controller 160. The controller 160 may be integrated into one and put in a rack, but may be divided into two or more.

The controller 160 transmits a signal to drive the XY scanner 120 so that the measuring object 1 may be scanned by the XY scanner 120 in the XY direction, while controlling the Z scanner 131 so that the probe part 110 has a constant mutual force with the surface of the measuring object 1 (that is, so that the cantilever maintains a certain degree of bending or the cantilever vibrates with a constant amplitude). That is, the controller 160 has a software or electro-circuit closed loop feedback logic. In addition, the controller 160 measures the length of the Z scanner 131 (alternatively, the length of an actuator used in the Z scanner 131), or measures a voltage applied to the actuator used in the Z scanner 131 and the like to acquire topography of the surface of the measuring object 1.

Here, the tip of the probe part 110 may move relative to the surface of the measuring object 1 while being in contact with the surface of the measuring object 1 (referred to as 'a contact mode'), and move relative to the surface of the measuring object 1 while vibrating without being in contact with the surface (referred to as 'a non-contact mode'). In addition, the tip of the probe part 110 may move relative to the surface of the measuring object 1 while vibrating by tapping the surface of the measuring object 1 (referred to as 'a tapping mode'). Since these various modes correspond to previously developed modes, detailed descriptions thereof will be omitted.

Meanwhile, the data about the surface of the measuring object 1 acquired by the controller 160 may be varied in addition to topography. For example, by special treatment of applying a magnetic force or applying an electrostatic force, etc. to the probe part 110, it is possible to acquire data on the magnetic force, data on the electrostatic force, etc. of the surface of the measuring object 1. These modes of the atomic force microscope include magnetic force microscopy (MFM), electrostatic force microscopy (EFM), and the like, and may be implemented using known methods. In addition, the data about the surface of the measuring object 1 may be a voltage of the surface, a current of the surface, and the like.

Meanwhile, it should be noted that the configuration of the head 130 only describes essential components for convenience of description, and specific configurations such as other optical systems are omitted. For example, the head 130 may further include components disclosed in Korean Patent No. 10-0646441.

Referring to FIG. 3, a configuration of an atomic force microscope 100' capable of tilting the head 130 is illustrated. For reference, in FIGS. 1 and 2, this configuration has been omitted, and in FIG. 3, for convenience of description, the laser generation unit 133, the detector 134, and the probe arm 132 have been omitted.

The atomic force microscope 100' is configured to tilt the head 130 to tilt the tip of the probe part 110 (not illustrated in FIG. 3 and will be described below in detail). The head 130 is connected to a guide part 172 by an extension block 171, and the guide part 172 may be formed in an arc shape to have a specific rotation radius.

The extension block 171 is configured to be slidably movable along the guide part 172, and the tip of the probe part 110 may be tilted according to the movement of the extension block 171. It is preferable that the specific rotation radius is set so that a distal end of the tip of the probe part 110 does not move according to the movement of the extension block 171, but even if not, as long as the tip may be tilted at a specific angle, the specific rotation radius may be set in any manner.

Meanwhile, when the head 130 is tilted by θ in a vertical direction from the measuring object 1, the Z scanner 131 is also tilted by θ, and as a result, the movement of the probe part 110 caused by the Z scanner 131 is also tilted by θ.

The configuration capable of tilting the head 130 as such has been disclosed in Korean Patent Registration No. 10-0761059, etc., of which the Applicant of the present invention is the Patentee, and the disclosed configuration is incorporated in the present invention by reference.

Referring to FIGS. 4A and 4B, the probe parts 110 and 110t include the cantilever 111 and the tips 112 and 112t. The cantilever 111 is a part where bending or vibration occurs, and since a laser spot generated by the above-described laser generation unit 133 is formed, the degree of bending and vibration may be measured by the detector 134.

The tips 112 and 112t extend from the cantilever 111, and are generally formed symmetrically in an X direction as illustrated in FIG. 4A. Of course, the probe part 110 may also be used in the method of the present invention by tilting the head 130 using the atomic force microscope 100' of FIG. 3. However, if the probe part 110t having a tip 112t tilted in the X direction is used as illustrated in FIG. 4B, the shape of the undercut structure may be better measured. Specifically, a distal end 113 of the tip may be formed obliquely out of a center C of the tip.

Referring to FIG. 4C, a tip tilted at various angles with respect to the X direction may be utilized in the present invention. Probe parts 110$t'$, 110$t''$, and 110$t'''$ in which the distal end 113 of the tip is tilted at 12°, 20°, 30°, etc. may be utilized in the method of the present invention. Of course, the probe part 110 that is not tilted at all may also be utilized in the method of the present invention.

The method of the present invention, which will be described below, may be performed in various combinations of devices and probe parts.

First, the method of the present invention may be performed in combination of the probe part 110 illustrated in FIG. 4A in which the tip 112 is formed so that the distal end 113 extends from the cantilever 111 to form a substantially straight line and the atomic force microscope 100' configured to move the tip 112 in the second direction for feedback on the surface of the measuring object 1 of the tip 112. Here, the second direction is a direction tilted without being perpendicular to the X scan direction (first direction), and is obtained by tilting the head 130 using the atomic force microscope 100' of FIG. 3. That is, the method of the present invention may be performed by the straight probe part 110 and the tilted head 130. Here, 'substantially forming the straight line' includes those which are manufactured with the aim of forming a straight line, but do not form an exact straight line due to errors caused by design errors, tolerances, errors during manufacturing, and the like. For example, 'substantially forming the straight line' means that the error between the center C of the tip 112 and the distal end 113 is 5% or less, more preferably 3% or less with respect to the total length of the tip 112.

Next, the method of the present invention may be performed in combination of the probe part 110$t$ illustrated in FIG. 4B in which the tip 112$t$ is formed so that the distal end 113 is tilted from the cantilever 111 not to form a substantially straight line and the atomic force microscope 100 configured to move the tip 112$t$ in the second direction for feedback on the surface of the measuring object 1 of the tip 112$t$. Here, the second direction is a direction substantially perpendicular to the X scan direction (the first direction), and is obtained without tilting the head 130 using the atomic force microscope 100 of FIG. 1. That is, the method of the present invention may be performed by the bent probe part 110$t$ and the non-tilted head 130. Here, 'substantially perpendicular' includes those which are manufactured with the aim to be perpendicular, but do not form exactly 90° due to errors caused by design errors, tolerances, errors during manufacturing, and the like. For example, 'substantially perpendicular' may mean that the first direction and the second direction form 89° or more and 91° or less, more preferably 89.5° or more and 90.5° or less.

Next, the method of the present invention may be performed in combination of the probe part 110$t$ illustrated in FIG. 4B in which the tip 112$t$ is formed so that the distal end 113 is tilted from the cantilever 111 not to form a substantially straight line and the atomic force microscope 100' configured to move the tip 112$t$ in the second direction for feedback on the surface of the measuring object 1 of the tip 112$t$. Here, the second direction is a direction tilted without being perpendicular to the X scan direction (first direction), and is obtained by tilting the head 130 using the atomic force microscope 100' of FIG. 3. That is, the method of the present invention may be performed by the bent probe part 110 and the tilted head 130. In this method, since an approach between the most tilted distal end 113 and the surface of the measuring object 1 may occur, there is an advantage of being able to measure the deepest undercut structure. Hereinafter, a method of measuring the undercut structure using the device according to the combination will be described.

Method for Acquiring Surface Characteristic of Measuring Object Having Undercut Structure Hereinafter, an exemplary embodiment of a method for acquiring a surface characteristic of a measuring object of the present invention will be described with reference to the accompanying drawings.

Figure 5:
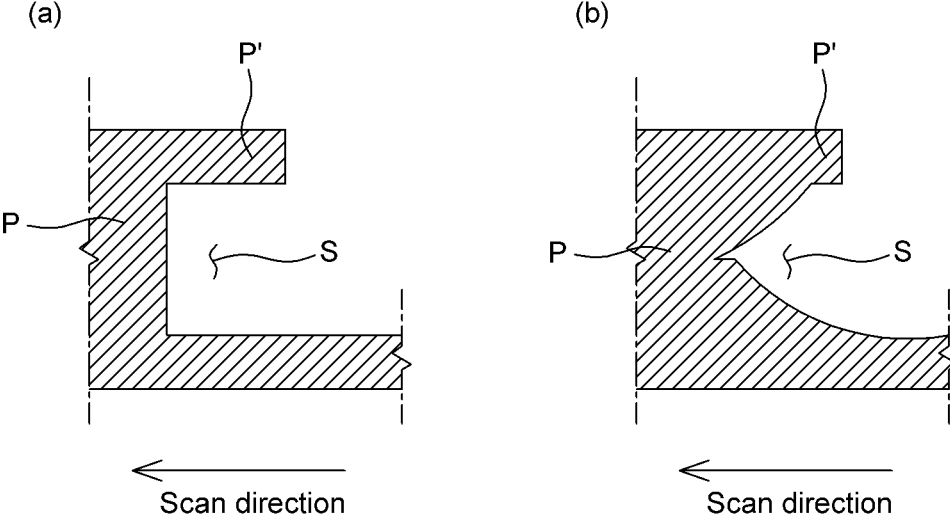
FIG. 5 is exemplary cross-sectional views of an undercut structure to which the method of the present invention is to be applied.
Figure 6:
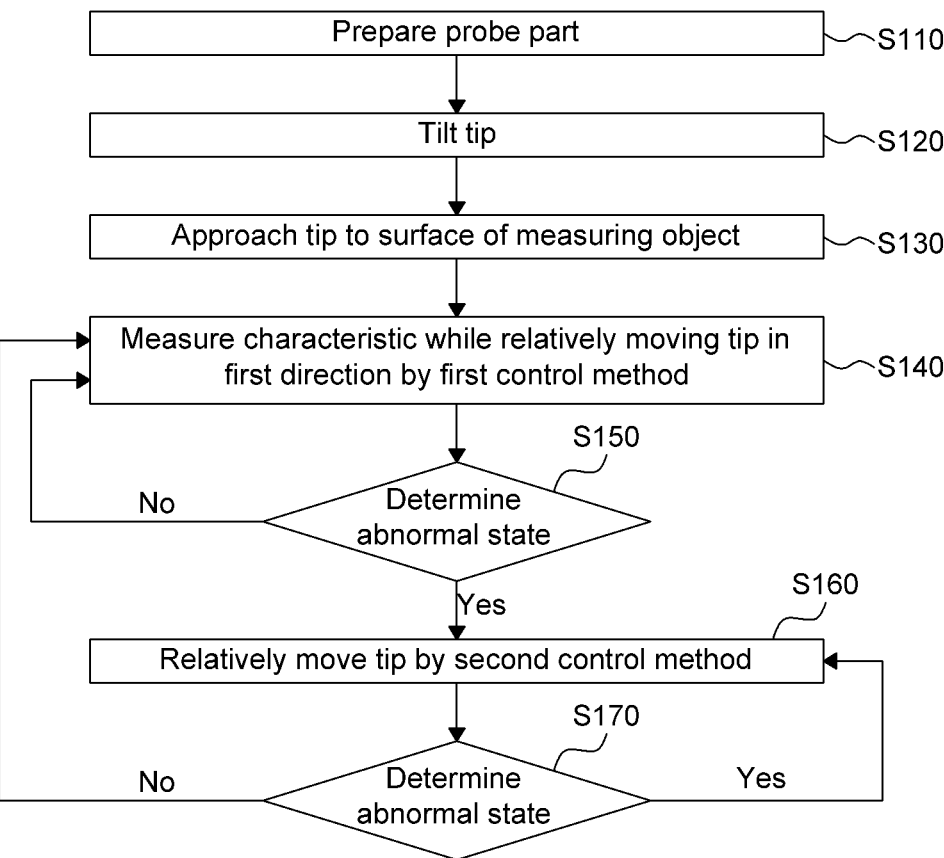
FIG. 6 is a flowchart illustrating steps of a method for acquiring a surface characteristic of a measuring object according to the present invention.
Figure 7:
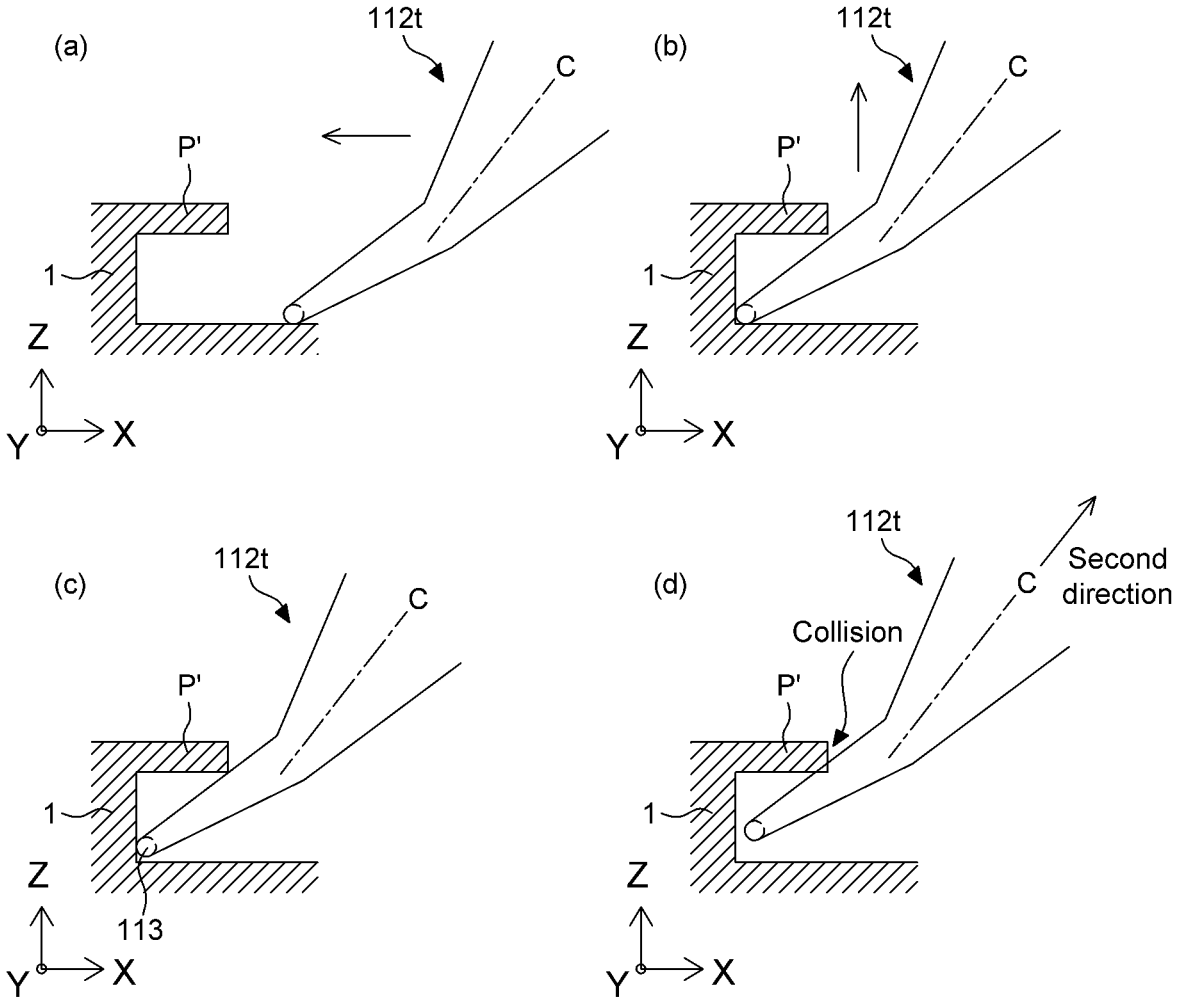
FIG. 7 is a side view sequentially illustrating the relative movement of a tip according to a first control method of FIG. 6.
Figure 8:
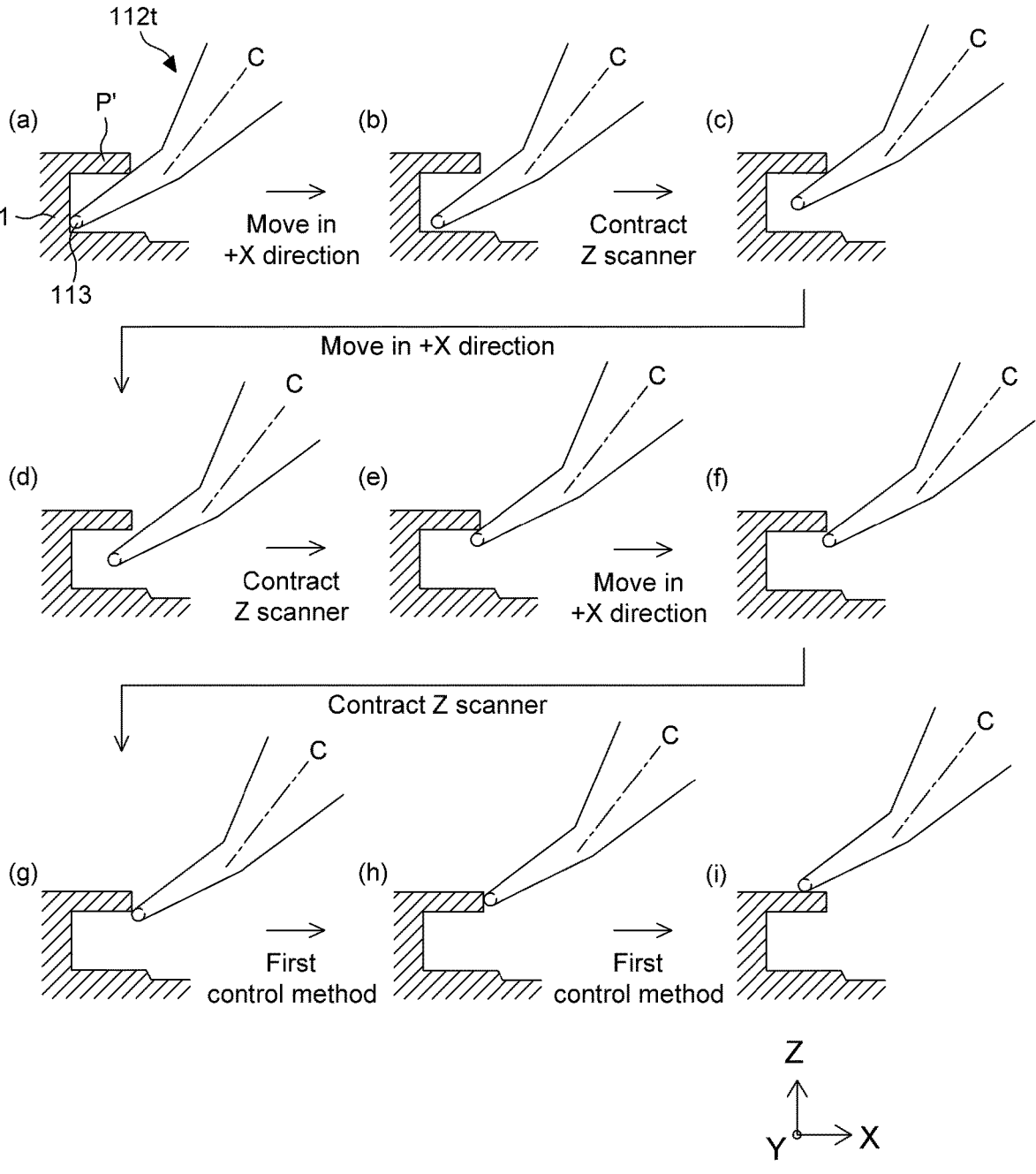
FIG. 8 is a side view sequentially illustrating the relative movement of a tip according to a second control method of FIG. 6.
Figure 9:
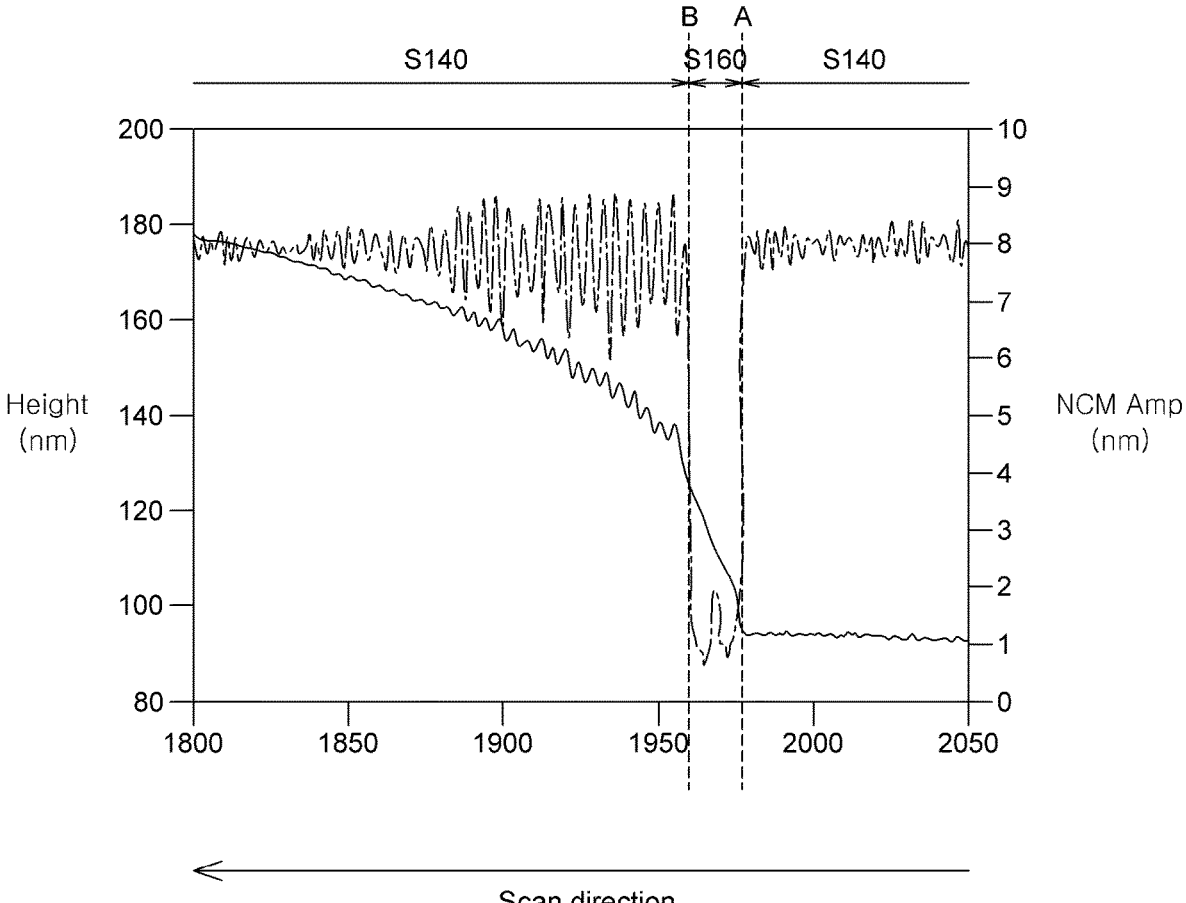
FIG. 9 is a graph showing the amplitude in a non-contact mode of the tip in an X-scan direction when the step of FIG. 6 is performed.

FIG. 5 is exemplary cross-sectional views of an undercut structure to which the method of the present invention is to be applied, FIG. 6 is a flowchart illustrating steps of a method for acquiring a surface characteristic of a measuring object according to the present invention, FIG. 7 is a side view sequentially illustrating the relative movement of a tip according to a first control method of FIG. 6, FIG. 8 is a side view sequentially illustrating the relative movement of a tip according to a second control method of FIG. 6, FIG. 9 is a graph showing the amplitude in a non-contact mode of the tip in an X-scan direction when the step of FIG. 6 is performed, and FIG. 10 is a graph showing a relationship between the amplitude and the speed of the tip for a control for carrying out the method according to the present invention.

Referring to FIG. 5, the shape of the undercut structure may be defined as a shape having a protrusion P protruding in a Z direction in an XY plane structure and a dent side of the protrusion P. For measurement, the undercut structure is defined as a structure including a concave shape that is open to a scan direction (in the description, referred to as –X direction, in other words, a relative movement direction of the tip, a 'first direction'). In other words, a shape in which a portion P' protruding in the X direction is present toward a Z direction may be defined as the shape of the undercut structure.

In view of the above definition, a shape having an inner space S and a portion P' protruding in the X direction as illustrated in FIG. 5A may be referred to as the shape of the undercut structure. In addition, as illustrated in FIG. 5B, a shape having a portion P' protruding in the X direction while the shape of the inner space S is bent may also be referred to as the shape of the undercut structure.

Eventually, in other words, when the plane of the measuring object is viewed from the upper side, a structure having the inner space S that is not visible from the lower side due to the protruding portion P' may be referred to as the undercut structure. As such, the definition may be made in various ways, and the present invention may be applied to these various modified examples.

In the following example, the method of the present invention will be described by exemplifying the measurement of FIG. 5A, which is the simplest undercut structure.

Referring to FIG. 6, first, a probe part is prepared (S110). The probe parts 110, 110$t$, 110$t''$, and 110$t'''$ may not be tilted as illustrated in FIG. 4 or may be selected from probe parts having a tilted tip at various angles. Depending on the shape of the undercut structure, a more tilted tip may be used if it is necessary to measure a deeper part. The selection of these probe parts 110, 110$t$, 110$t''$, and 110$t'''$ may be appropriately determined according to the shape of the undercut structure.

These probe parts 110, 110$t$, 110$t''$, and 110$t'''$ are mounted on the head 130 of FIGS. 1 to 3, more specifically the probe arm 132, and as illustrated in FIG. 2, the laser from the laser generation unit 133 is reflected by the cantilever 111 to be focused on the detector 134, and then the preparation is completed.

Thereafter, by tilting the head 130, the tips 112 and 112$t$ are tilted (S120). When the atomic force microscope 100' of FIG. 3 is used, the head 130 may be tilted, and the tilted angle may be appropriately selected in consideration of the shape of the undercut structure to be measured. Of course, this step may also be omitted by mounting the probe parts 110$t'$, 110$t''$, and 110$t'''$ including the tilted tip 112$t$ on the non-tilted head 130.

Thereafter, the tips 112 and 112$t$ approach the surface of the measuring object 1 (S130). The tips 112 and 112$t$ approach the surface of the measuring object 1 in a tilted state, and may be approached in a non-contact mode or tapping mode state. In the case of the non-contact mode or tapping mode, the tips 112 and 112$t$ vibrate at a specific frequency, and the tips 112 and 112$t$ approach the surface of the measuring object 1 until the amplitude of a specific frequency reaches a specific value, and then the approach is completed. This approaching method follows existing approach methods in the non-contact mode or tapping mode, and is also applied even to the present method as it is.

Thereafter, by using a first control method, while the tips 112 and 112$t$ move relative to the surface of the measuring object 1 in the first direction, the surface characteristic of the measuring object 1 is acquired (S140).

The first direction refers to a relative movement direction of the tips 112 and 112$t$ with respect to the measuring object 1, and refers to an —X direction in the present description with reference to FIGS. 7 and 8. The relative movement of the tips 112 and 112$t$ may also be achieved while the measuring object 1 is fixed and the tips 112 and 112$t$ are moved. However, as illustrated in FIGS. 1 to 3, according to the structures of the atomic force microscopes 100 and 100' in which the XY scanner 120 and the Z scanner 131 are separated, the Z scanner 131 only serves to move for maintaining a predetermined distance from the surface of measuring object 1, and the measuring object 1 moves according to the scan of XY scanner 120, so that the relative movement of the tips 112 and 112$t$ may also be achieved. In the present description, for convenience, it is described as if the tips 112 and 112$t$ move, but this only means relative movement, and it is not meant that only the tips 112 and 112$t$ actually move.

The first control method refers to a control method of performing feedback control to maintain a predetermined distance from the surface of the measuring object 1 while the tips 112 and 112$t$ operate in the non-contact mode or tapping mode. That is, it may be understood that the control method using a general non-contact mode or tapping mode is the first control method.

As such, in the step (S140), the tip 112$t$ is tilted and follows the surface of the measuring object 1 while maintaining a certain distance from the surface of the measuring object to be scanned in the —X direction. When the tip 112$t$ moves relatively in a —X direction as illustrated in FIG. 7A and then meets the portion protruding in a +Z direction as illustrated in FIG. 7B, the tip 112$t$ follows the surface of measuring object 1 even in the +Z direction by contracting the Z scanner 131. Then, as illustrated in FIG. 7C, the side other than the distal end 113 of the tip 112$t$ comes close to the protruding portion P' in the +X direction, thereby affecting the vibration of the tip 112$t$.

At this time, referring to FIG. 9, at the moment when the first control method is performed while the amplitude is maintained in a specific range (about 7.5 to 8.5 nm) (S140), and then the protruding portion P' affects the side of the tip 112$t$, the amplitude of the tip 112$t$ in the non-contact mode suddenly drops to a predetermined value (about 2 nm) or less (in FIG. 9, an alternated long and short dash line represents an amplitude, and a solid line represents a height of the tip (i.e., the height of the Z scanner 131)). In the first control method, the amplitude of the tip 112$t$ that has been controlled to have an amplitude of 8 nm suddenly drops to about 2 nm or less. This sudden drop in amplitude means that 'abnormal contact at the side' other than the distal end 113 of the tip 112$t$ has occurred (hereinafter, referred to as an 'abnormal state'). It may be determined that such an abnormal contact is based on the assumption that an undercut structure will be present on the surface of the measuring object 1 in advance.

As such, while measuring the surface of the measuring object 1 through the first control method, it is monitored in real time whether an abnormal state occurs, and if the abnormal state occurs, it is determined as an abnormal state (S150).

The determining of whether the abnormal state occurs may be determined as a case where at least one characteristic value obtained by the tip 112$t$ is out of a specific range. These characteristic values may be any values that may be changed due to an unexpected contact at the side other than the distal end 113 of the tip 112$t$. In the exemplary embodiment, it is exemplified that the amplitude of the tip 112$t$ vibrating in the non-contact mode or tapping mode is used as such a characteristic value.

Referring back to FIG. 9, the contact of a portion other than the distal end 113 of the tip 112$t$ acts as a factor for sharply decreasing the amplitude of the tip 112$t$, which exceeds the range of control that the first control method may feedback (point A). As such, when the amplitude of the tip 112$t$ drops below a specific value, it may be determined as an abnormal state. Here, in FIG. 9, the specific value may be set to 5.0 nm, 4.0 nm, or 3.0 nm. In addition, the specific value may also be set as a value of 50%, a value of 40%, or the like of an amplitude (also referred to as a set point) which is feedback-controlled and maintained according to the first control method.

Meanwhile, if the tip 112$t$ is controlled by the first control method even after it is determined as the abnormal state, since the sudden decrease in amplitude means that the tip 112$t$ is rapidly and very close to the surface of the measuring object 1, as illustrated in FIG. 7D, the Z scanner 131 rapidly lifts the tip 112$t$. Since the Z scanner 131 is configured to move the tip 112$t$ along the center C of the tip 112$t$ for feedback on the surface of the measuring object 1 of the tip 112$t$, when the Z scanner 131 rapidly lifts the tip 112$t$, the tip 112$t$ collides with the protruding portion P' in the X direction of the undercut shape to be easily damaged. Accordingly, after the abnormal state is determined, the behavior of the tip 112$t$ and the XY scanner 120 should not be controlled according to the first control method.

Accordingly, after the abnormal state is determined, a separation step for separating from the abnormal state is performed by controlling the XY scanner and the Z scanner by a second control method different from the first control method (S160).

In the second control method, in order to prevent damage to the tip 112$t$, while the contraction of the Z scanner 131 (lifting of the tip 112$t$) is not performed or minimized immediately after the determination of the abnormal state, the tip 112$t$ moves relatively in a +X direction which is a scan direction opposite to the first direction.

In other words, the second control method is performed by a combination of a first operation of relatively moving the tip 112*t* on the surface of the measuring object 1 in the opposite direction (+X direction) to the first direction (−X direction) and a second operation of separating the tip 112*t* from the surface of the measuring object 1. The first operation and the second operation are defined to be performed simultaneously or sequentially. That is, the first operation and the second operation may be implemented as one combined operation without distinction, or the first operation and the second operation may be sequentially performed alternately.

The second control method will be described in detail with reference to FIG. 8.

When it is determined as an abnormal state as illustrated in FIG. 8A, by moving the measuring object 1 by the XY scanner 120 in the —X direction as illustrated in FIG. 8B, while the tip 112*t* relatively moves in the +X direction, the contraction (lifting of the tip) of the Z scanner 131 is not performed or minimized.

Thereafter, the Z scanner 131 is contracted to lift the tip 112*t* as illustrated in FIG. 8C. The Z scanner 131 moves the tip 112*t* along the center C of the tip 112*t* (along the second direction). That is, by the Z scanner 131, the distal end 113 of the tip 112*t* relatively moves in the +X direction and the +Z direction. When the tip 112*t* is lifted, the side of the tip 112*t* comes into contact with the protruding portion P' again.

When it is determined that the side of the tip 112*t* comes into contact with the protruding portion P' again, as illustrated in FIG. 8D, the tip 112*t* relatively moves in the +X direction again. Thereafter, the Z scanner 131 is contracted to lift the tip 112*t* again as illustrated in FIG. 8E. This operation is further repeated as illustrated in FIGS. 8F and 8G.

When this operation is repeated and then the distal end 113 other than the side of the tip 112*t* interacts with the protruding portion P' as illustrated in FIG. 8G, the amplitude of the tip 112*t* enters into the range of the amplitude that may be controlled by the first control method. Then, the second control method is terminated. As a result, the separation step (S150) is completed.

Thereafter, the surface of the measuring object 1 is scanned using the first control method as illustrated in FIGS. 8H and 8I.

Referring to FIG. 10, the first control method and the second control method will be described in detail again.

The first control method refers to a method in which the tip 112*t* is controlled to have a specific amplitude (set point) along the surface of the measuring object 1 according to a general non-contact mode or tapping mode. The first control method controls the tip 112*t* to be close to the surface of the measuring object 1 by extending the Z scanner 131 when it is determined that the tip 112*t* is far away from the surface of the measuring object 1 when the measured amplitude is larger than the specific amplitude (set point) according to the control method of a general atomic force microscope (control along a right line of the set point). In addition, the first control method controls the tip 112*t* to be away from the surface of the measuring object 1 by contracting the Z scanner 131 when it is determined that the tip 112*t* is close to the surface of the measuring object 1 when the measured amplitude is smaller than the specific amplitude (set point) according to the control method of the general atomic force microscope (control along a left line of the set point).

At this time, the XY scanner 120 is controlled to move the measuring object 1 in a constant direction (X direction) (illustrated by a solid line). In the exemplary embodiment, it is exemplified that the movement in the X direction is controlled at a constant speed, but this is only an example, and if only the scan direction is maintained, the scan speed is variable.

As such, the first control method controls a distance between the surface of the measuring object 1 and the tip 112*t* by contracting or extending the Z scanner 131 so that the tip 112*t* vibrates with a specific amplitude (set point) within the 'first control method section'.

When the amplitude of the tip 112*t* is lower than a threshold value (i.e., it is determined as an abnormal state), the second control method is applied. The second control method is, as described above with reference to FIG. 8, a control method for separating the distal end 113 of the tip 112*t* from the inner space of the undercut structure by a combination of movement in the X direction by the XY scanner 120 and movement in the second direction by the Z scanner 131.

When the amplitude of the tip 112*t* starts to become lower than the threshold value, first, the moving speed in the X direction by the XY scanner 120 starts to decrease (see the solid line). In addition, the contraction speed of the Z scanner 131 decreases (see an alternated long and short line). In the method, a collision between the protruding portion P' and the side of the tip 112*t* is prevented.

If the amplitude of the tip 112*t* becomes lower, the movement direction in the X direction by the XY scanner 120 is reversed. At this time, the Z scanner 131 is continuously contracted to lift the tip 112*t*. Since the Z scanner 131 is contracted while performing the X-direction scan in the direction opposite to the scan direction in the X-direction in the first control method, the tip 112*t* may be separated from the undercut structure.

Here, the contraction speed by the Z scanner 131 is preferably set to a lower limit. The Z scanner 131 is not controlled to be extended by the second control method, but continuously performs contraction for which the lower limit is set.

The threshold value may serve as a target value, that is, a set point of the second control method. This is because the second control method is a transitional stage, and is aimed at separation. As a result, the amplitude value of the tip 112*t* may enter into the section of the first control method by the second control method, and after entering, the first control method is performed to obtain a normal image.

Referring back to FIG. 6, it is continuously determined whether the tip 112*t* is in the abnormal state even while the tip 112*t* is controlled by the second control method (S170). If the abnormal state continues by this determination, the second control method is continuously performed, and when it is determined that the abnormal state deviates (when the amplitude enters into the range controllable by the first control method as illustrated in FIG. 9B), the control method is changed to the first control method (S140). That is, when step S140 to which the first control method is applied and step S160 to which the second control method is applied are performed, the determination of the abnormal state (S150 and S170) should be accompanied.

According to the method of the present invention as described above, it is possible to image more deeply the shape of the undercut structure, and to measure an image again by automatically and quickly separating a tip entering the inner space of the undercut structure from the inner space to facilitate the operation, thereby expecting an increased throughput.

Hereinabove, the exemplary embodiments of the present invention have been described with the accompanying drawings, but it can be understood by those skilled in the art that the present invention can be executed in other detailed forms without changing the technical spirit or requisite features of the present invention. Therefore, it should be appreciated that the embodiments described above are illustrative in all aspects and are not restricted.

What is claimed is:

1. A method for acquiring a surface characteristic of an object using a measuring device including a tip interacting with the surface of the object, the method comprising:

acquiring a surface characteristic of the object while relatively moving the tip in a first direction with respect to the surface of the object using a first control method in a normal measuring state;

controlling the tip to deviate from an abnormal measuring state by a second control method set based on a predefined shape of the surface of the object when the abnormal measuring state is determined, the abnormal measuring state existing when at least one characteristic value obtained in the normal measuring state is out of a specific range; and returning to the first control method if the abnormal measuring state is determined to not exist while using the second control method, wherein, in the second control method, the tip is controlled to vibrate at a specific frequency, the at least one characteristic value including an amplitude of the vibrating tip, the abnormal measuring state determined when the amplitude is out of the specific range, wherein the second control method is configured by combining a first operation of relatively moving the tip in a direction opposite to the first direction with respect to the surface of the object, and a second operation of separating the tip from the surface of the object, and wherein the second control method is defined so that the first operation and the second operation are selectively executed as either (i) a combined operation performed simultaneously or (ii) alternating operations performed sequentially.

2. The method of claim 1, wherein the predefined shape of the surface is a shape of an undercut structure opened to the first direction.

3. The method of claim 2, wherein the measuring device is an atomic force microscope, and wherein, in the first control method, the tip is controlled in a non-contact mode or tapping mode with respect to the object.

4. The method of claim 3, wherein the tip extends from a cantilever and has a distal end, and wherein, when moving the tip to acquire the surface characteristic of the object, the distal end precedes the cantilever with respect to the first direction, and then the tip interacts with the surface of the object in a tilted state.

5. The method of claim 4, wherein the tip is formed to extend from the cantilever so that the distal end is substantially straight, the measuring device is configured to move the tip in a second direction for feedback on the surface of the object of the tip, and the second direction is a direction tilted without being perpendicular to the first direction.

6. The method of claim 4, wherein the tip is formed to be tilted from the cantilever so that the distal end is not straight, the measuring device is configured to move the tip in a second direction for feedback on the surface of the object of the tip, and the second direction is substantially perpendicular to the first direction.

7. The method of claim 4, wherein the tip is formed to be tilted from the cantilever so that the distal end is not straight, the measuring device is configured to move the tip in a second direction for feedback on the surface of the object of the tip, and the second direction is a direction tilted without being perpendicular to the first direction.

8. A computer program stored in a storage medium for performing the method of claim 1.

9. An atomic force microscope configured to measure a surface of an object by a probe part having a tip and a cantilever, the atomic force microscope comprising:

an XY scanner configured to move the object so that the tip relatively moves in a first direction with respect to the surface of the object;

a head configured so that the probe part may be mounted, the head including an optical system capable of measuring vibration or deflection of the cantilever and a Z scanner configured to move the probe part in at least a second direction and in a direction opposite to the second direction so as to control a distance between the tip and the surface of the object based on data obtained by the optical system; and a controller configured to control the XY scanner and the head so as to:

acquire a surface characteristic of the object while relatively moving the tip in a first direction with respect to the surface of the object using a first control method in a normal measuring state, control the tip to deviate from an abnormal measuring state by a second control method set based on a predefined of the surface of the object when the abnormal measuring state is determined, the abnormal measuring state existing when at least one characteristic value obtained in the normal measuring state is out of a specific range, and return to the first control method if the abnormal measuring state is determined to not exist while using the second control method, wherein, in the second control method, the tip is controlled to vibrate at a specific frequency, the at least one characteristic value including an amplitude of the vibrating tip, the abnormal measuring state determined when the amplitude is out of the specific range, wherein the second control method is configured by combining a first operation of relatively moving the tip in a direction opposite to the first direction with respect to the surface of the object, and a second operation of separating the tip from the surface of the object, and wherein the second control method is defined so that the first operation and the second operation are selectively executed as either (i) a combined operation performed simultaneously or (ii) alternating operations performed sequentially.

10. The atomic force microscope of claim 9, wherein the predefined shape of the surface is a shape of an undercut structure opened to the first direction.

11. The atomic force microscope of claim 10, wherein the head is configured to be tiltable, so that the tip is approached obliquely with respect to the surface of the object.

12. The atomic force microscope of claim 9, wherein the first operation is performed using the XY scanner, and wherein the second operation is performed using the Z scanner.

\* \* \* \* \*